US007669178B2

(12) United States Patent
Chiles et al.

(10) Patent No.: US 7,669,178 B2
(45) Date of Patent: *Feb. 23, 2010

(54) SYSTEM AND METHOD FOR INTERACTING WITH COMPUTER PROGRAMMING LANGUAGES AT SEMANTIC LEVEL

(75) Inventors: William P Chiles, Seattle, WA (US); Randy S Kimmerly, Woodinville, WA (US); Shankar Vaidyanathan, Sammamish, WA (US); David S Waggoner, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 995 days.

This patent is subject to a terminal disclaimer.

(21) Appl. No.: 10/967,734

(22) Filed: Oct. 18, 2004

(65) Prior Publication Data

US 2005/0081193 A1    Apr. 14, 2005

Related U.S. Application Data

(63) Continuation of application No. 09/686,033, filed on Oct. 11, 2000, now Pat. No. 6,832,365.

(51) Int. Cl.
*G06F 9/44* (2006.01)
(52) U.S. Cl. ........................................ 717/100; 717/107
(58) Field of Classification Search ......... 717/100–104, 717/107–113
See application file for complete search history.

(56) References Cited

U.S. PATENT DOCUMENTS

| 5,325,533 | A | * | 6/1994 | McInerney et al. | .......... 717/107 |
| 5,428,792 | A | * | 6/1995 | Conner et al. | ............... 717/143 |
| 5,778,227 | A | | 7/1998 | Jordan | |
| 5,787,470 | A | | 7/1998 | DeSimone et al. | |
| 6,182,160 | B1 | | 1/2001 | Burgess | |
| 6,269,473 | B1 | | 7/2001 | Freed et al. | |
| 6,499,137 | B1 | | 12/2002 | Hunt | |
| 6,526,566 | B1 | | 2/2003 | Austin | |
| 6,581,203 | B1 | | 6/2003 | Nguyen et al. | |
| 6,690,981 | B1 | * | 2/2004 | Kawachi et al. | ................ 700/83 |
| 6,832,365 | B1 | | 12/2004 | Chiles et al. | |
| 2002/0016954 | A1 | | 2/2002 | Charisius et al. | |

OTHER PUBLICATIONS

A.H. Lee, et al., Reflections on Metaprogramming, IEEE Transactions on Software Engineering, Nov. 1995, pp. 883-893, vol. 21, No. 11.

(Continued)

*Primary Examiner*—James Rutten
(74) *Attorney, Agent, or Firm*—Workman Nydegger

(57) ABSTRACT

The present invention relates to a system and method that models computer programming language concepts in a plurality of objects and enables a computer programmer to interact with multiple programming languages through one code model interface. This allows the computer programmer to identify objects or functionality available in an application without having to know or specify an underlying language that implements that object or functionality. The computer programmer can employ the code model to locate an object that implements a specific functionality and return a code model object that implements that functionality. The computer programmer may then interact with that code model object rather than having to interact with the computer programming language.

28 Claims, 10 Drawing Sheets

OTHER PUBLICATIONS

T. Lewis, Code Generators, IEEE Software, May 1990, pp. 67-69.
Harmain. H.M., et al. "C-M Builder" An Automated NL-based CASE Tool Automated Software Engineering, 2000. p. 45-54.
D. Regep, et al. "Using MetaScribe to Prototype an UML to C++/Ada95 Code Generator" IEEE, 2000, p. 1-6.
G. Karsai, "Why XSL is not suitable for Semantic Translation" 2000, p. 1-4.

* cited by examiner

SYSTEM AND METHOD FOR INTERACTING WITH COMPUTER PROGRAMMING LANGUAGES AT SEMANTIC LEVEL

RELATED APPLICATIONS

This application is a continuation of U.S. Ser. No. 09/686,033, filed on Oct. 11, 2000, entitled "SYSTEM AND METHOD FOR INTERACTING WITH COMPUTER PROGRAMMING LANGUAGES AT SEMANTIC LEVEL," the entirety of which is incorporated herein by reference.

TECHNICAL FIELD

The present invention relates generally to computer programming languages, and more particularly to a system and method for interacting with computer programming languages at a semantic and/or a syntactic level through an object-oriented code model and interface.

BACKGROUND OF THE INVENTION

Computer programs are written in one or more programming languages and generally have their own syntax. Computer programming languages also have their own set of axiomatic semantic concepts, features and functionality. The axiomatic semantic concepts define a language in terms of discrete entities that are implemented by that language. For example, a language may implement entities such as objects, subroutines, functions, data structures, control structures, decision structures, statements and expressions. Differences in syntax, semantics and functionality introduce complexity into computer programming, however, since programmers must decide which languages to work with, and must learn the syntax, semantic concepts, features and functionality of various languages. Unfortunately, valuable time, energy and resources are expended interacting with various languages.

Computer programming has become more tool-based. Thus, tools like wizards, modeling tools, code analyzers and code generators, for example, have become more common. But creating such tools is hampered by the necessity of the tool maker having to create a parser for each language with which the tool interacts.

Differences in accessing object attributes and invoking object methods may also add complexity to computer programming. For example, some languages pass parameters by reference while others pass parameters by value and yet others may use a combination. Thus, interacting with different languages may require adherence to different parameter passing protocols. Consequently, there is a need for an interface model to simplify programming and interactions with various languages.

SUMMARY OF THE INVENTION

The present invention relates to a system and method for modeling programming language concepts via a plurality of code model objects. The present invention enables a computer programmer to interact with a plurality of programming languages through a code model interface wherein syntactically and functionally unique programming languages are modeled by objects that encapsulate the semantics and functionality of the language. Thus, the present invention provides a set of objects and an interface to the set of objects associated with a code model of one or more programming languages. The code model returns to the programmer objects that encapsulate the high level or semantic programming elements of the computer programming language while insulating the programmer from the syntax of the high-level, semantic programming elements. Although the programmer is insulated from the syntax of the code behind the object, the programmer has the ability to access code behind the object and to change the code.

The code model enables computer programmers to learn the interface to the code model objects, and then employ the functionality embedded in other computer programming languages that implement the code model. The code model programmer thus gains access to many languages, objects and functionalities while only learning one syntax.

More particularly, the present invention utilizes a set of code model objects to provide a map to an abstraction of programming languages as modeled by their semantic elements. An example set of semantic elements available to be modeled by the code model objects may be listed in a collection and/or enumeration in accordance with one aspect of the present invention. A semantic element listed in the collection and/or enumeration may model high-level abstractions of semantic concepts embodied in programming languages like a class, an object, a function, a method, an attribute, a variable, a delegate, a statement and a parameter, for example. Thus programmers may view the semantic elements of a language and utilize the semantic elements in a language without learning the syntax of that language. For example objects, functions, methods, attributes, variables, delegates and parameters of programming languages may be employed without learning the syntax specific to the language from which those semantic elements were drawn.

Different programming tools, for example Class View, wizards, UML modeling tools, may desire to interact with programming projects. The code model facilitates understanding the contents of the project and thus facilitates interacting with (e.g. modifying, adding, deleting) the project in a language neutral way. For example, Class View may retrieve a list of classes found in a project and a wizard may add a database class to the project without knowing the syntax or semantics of the project language.

Furthermore, the code model mitigates the problem of tool builders having to build parsers for each language with which they desire to interact. The code model allows the tool builder to build one parser to the code model thus mitigating the multiple parser problem.

The code model also enables the programmer to change implementations of programming elements behind the code model object by adding, subtracting and/or modifying items like attributes and/or by invoking methods from that code model object. The computer programmer can change the implementations either by interacting with the code model object methods or by directly accessing a text editor to manually change the programming element behind the code model object.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

Figure 1:
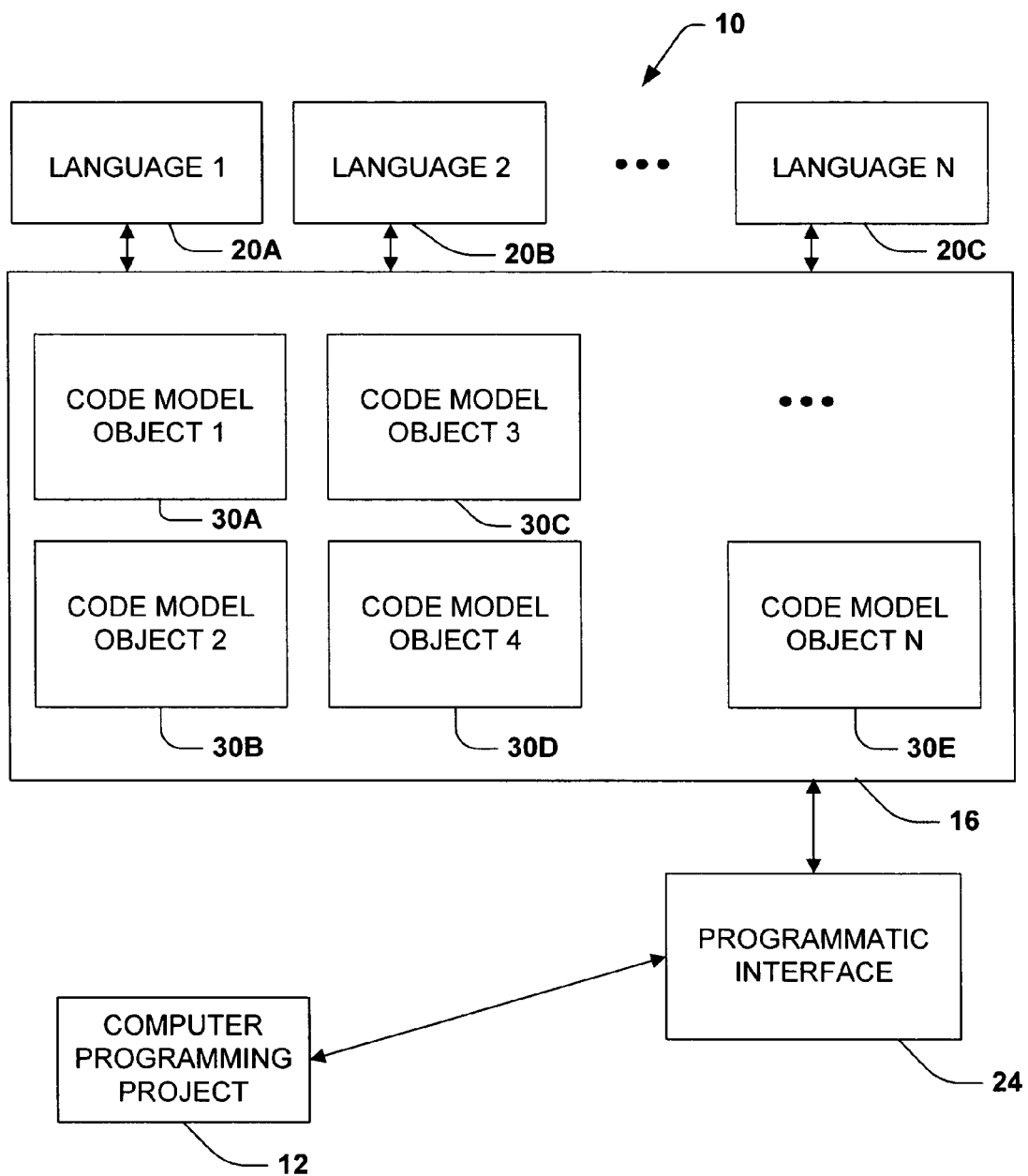
FIG. 1 is a schematic block diagram illustrating a system for interacting with computer programming languages by using a programmatic interface to a plurality of objects in accordance with an aspect of the present invention.

The present invention is now described with reference to the drawings, wherein like reference numerals are used to refer to like elements throughout. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram form in order to facilitate description of the present invention.

Computer programs are written in one or more computer programming languages that may have their own syntax, semantics and functionality. Conventionally, the syntax, semantics and functionality of a language had to be dealt with by a programmer when an application was generated. Thus, common high-level semantic concepts, data structures, interfaces and functionality may be exploited from a single language interface/structure. For example, many programming languages implement objects. But syntactic differences between programming languages and inconsistent and/or complicated interfaces to those objects make it difficult for a programmer to incorporate objects from more than one computer language into an application or to easily switch between programming languages. Also for example, a computer programming language may have a sorting functionality built in. The code model objects enables the programmer to use such sorting functionality without knowing which language is implementing the sorting functionality. Thus, the programmer may interact with the code model object that encapsulates the sorting functionality rather than interacting directly with the sorting subroutine. In this manner, the programmer is insulated from the syntactic details of the language associated with the sorting functionality.

Referring initially to FIG. 1, a schematic block diagram illustrates a system 10 whereby a programmer interacts with computer programming languages without having to know their syntax via a code model 16. The code model 16 may include one or more code model objects 30A-30C, hereinafter referred to as the code model objects 30, to facilitate interactions with a plurality of programming languages 20A-20C on a semantic level. A programmer may desire to create a computer programming project 12, wherein the project 12 benefits from access to the plurality of computer programming languages 20A, 20B, and 20C, hereinafter referred to as the languages 20. Rather than interacting directly with the languages 20 the programmer may interact instead with a programmatic interface 24 to the code model 16. The programmatic interface 24 includes a set of methods for accessing the code model objects 30 and enables, among other aspects, reading, writing, and changing the code model objects 30. The code model objects 30, which may be incorporated into the project 12, facilitate interacting with the programming languages 20 at a semantic level by enabling browsing of code, browsing of class structures, browsing of semantic concepts and modeling of common semantic concepts, for example, and are described in more detail below. Such modeling isolates the programmer from the syntax of the languages 20.

By way of illustration, Visual Basic may implement several objects. Utilizing the browsing functionality of the code model 16, wherein desired functionality from the Visual Basic may be identified by a programmer, the programmer may then create instances of code model objects 30 to encapsulate the functionality of the desired objects available in Visual Basic. The programmer may then change the encapsulated functionality, either via the programmatic interface 24, and/or manually.

By way of further illustration, the project 12 may require the functionality of a graphing object, a sorting subroutine and a differential equation function. The project 12 may incorporate code model objects 30 that encapsulate the desired functionality rather than directing calls to the objects, subroutines and functions implementing the desired functionality. The graphing object may, for example, be implemented in Visual Basic while the sorting subroutine may, for example, be implemented in C and the differential equation implemented in FORTRAN. The programmer may access functionality in substantially all of the languages 20 via the programmatic interface 24 and the code model objects 30. Therefore, by learning the programmatic interface 24 to the code model objects 30, the programmer is isolated from the choice of languages implementing the functionality and the syntax of the languages implementing the functionality. It is to be appreciated that more or less programming languages may be modeled by the present invention.

Figure 2A:
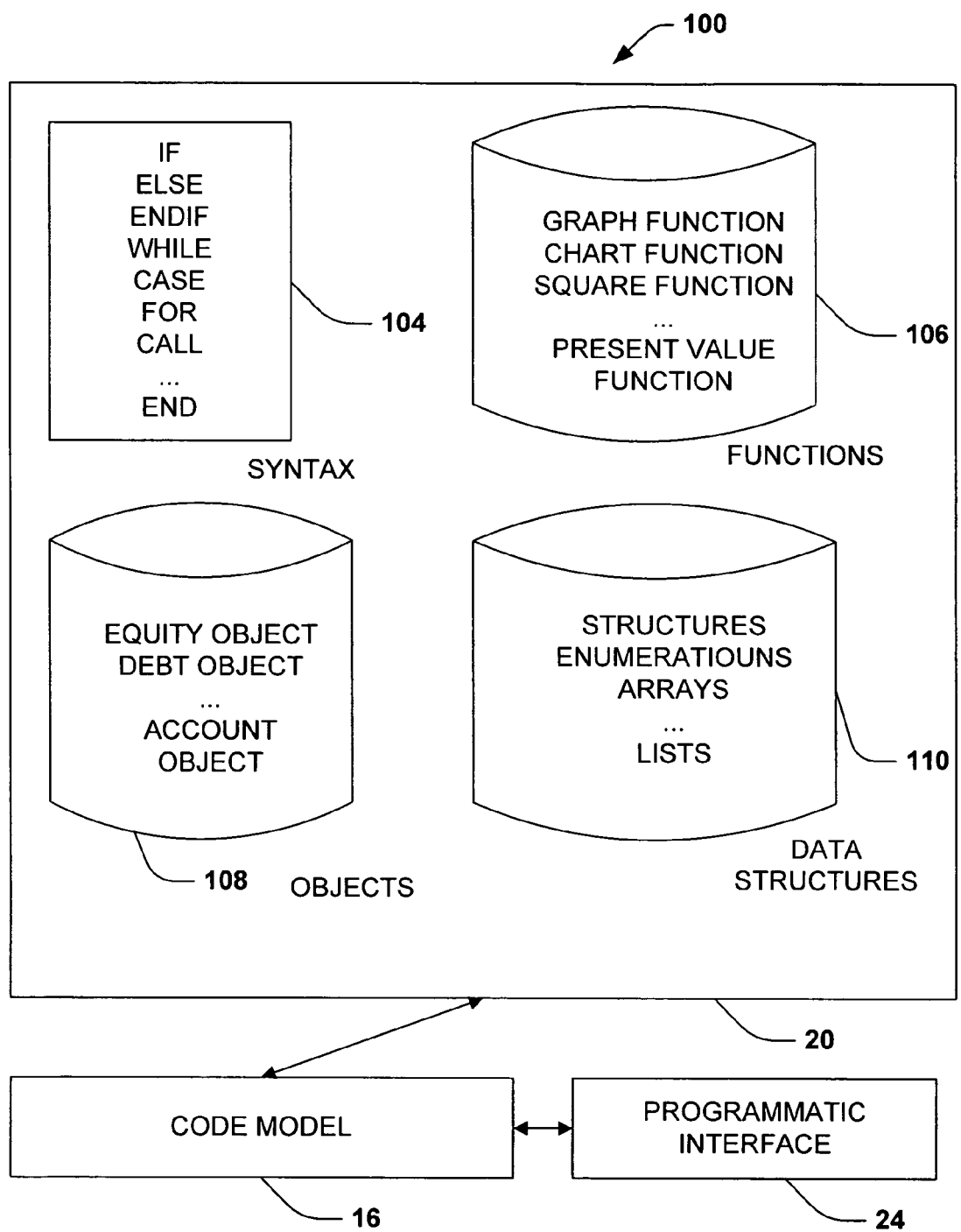
FIG. 2A is a schematic block diagram illustrating a system for interacting with the component parts of a programming language by using a programmatic interface to a plurality of objects in accordance with an aspect of the present invention.

Referring now to FIG. 2A, a system 100 illustrates browsing a programming language 20 through the programmatic interface 24 associated with the code model 16. The programming language 20 may include a syntax 104, a plurality of functions 106, a plurality of objects 108 and a plurality of data structures 110. The programmer may desire to examine the programming language 20 to determine which of the functions 106, the objects 108 and the data structures 110 the programming language 20 implements. The code model 16 enables the browsing of, among other aspects, the syntax 104, functions 106, objects 108, and data structures 110 of the programming language 20. Using the code model 16, the programmer may navigate code written in the programming language 20 down to, among others, the class, member, statement, expression, variable and method levels. The browsing may include, among other aspects, the ability to find a class or method by name or signature, and to discover the basic aspects of the language including access modifiers, types, signatures, names, implemented interfaces and inheritance structures, for example.

Figure 2B:
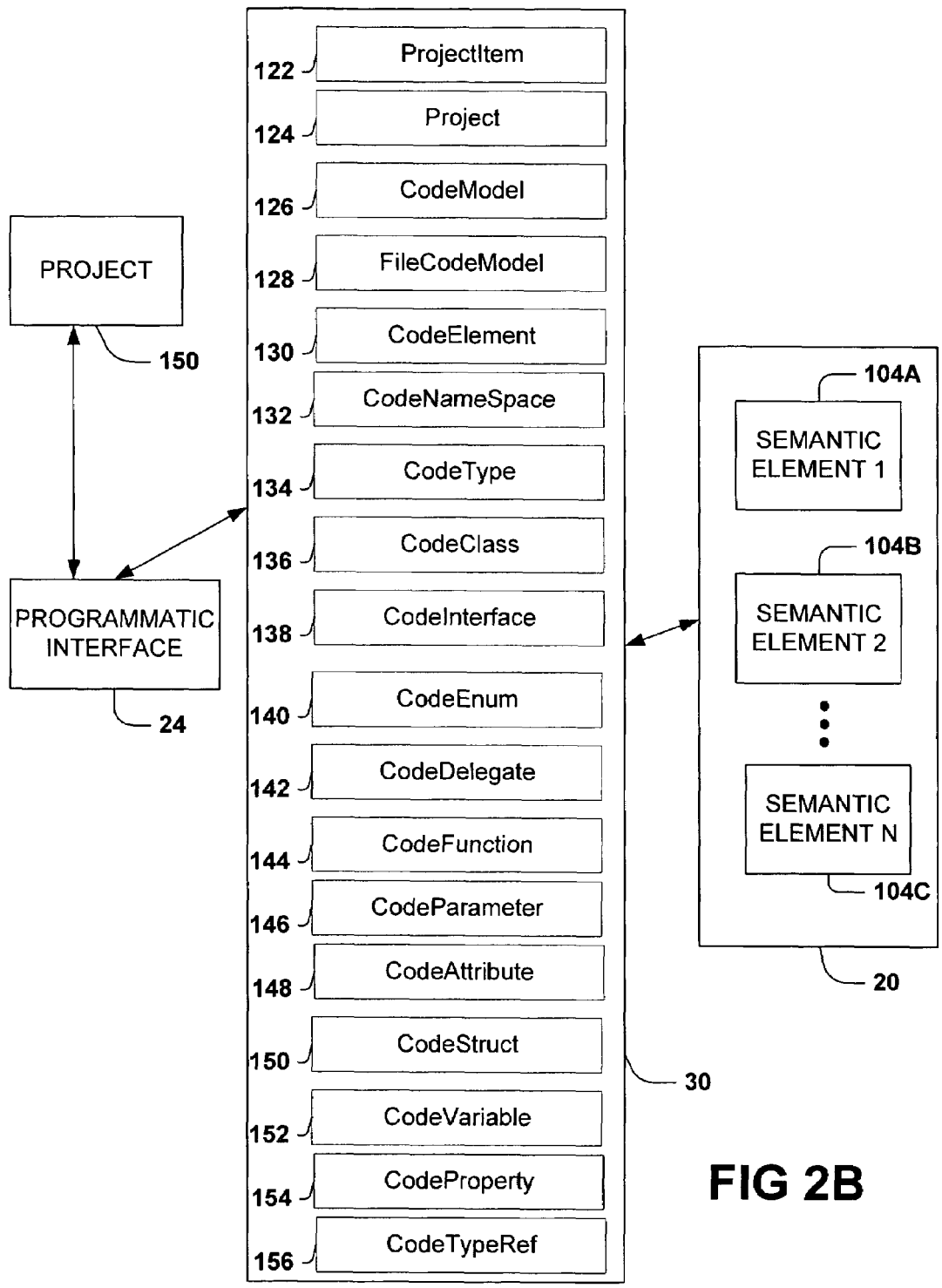
FIG. 2B is a schematic block diagram illustrating an example aspect of the present invention.

Turning now to FIG. 2B, one possible set of object classes 30 illustrate an aspect of the present invention relating to isolating the programmer from the semantics of the programming language 20 via modeling and abstraction. A programmer gains access to the set of object classes 30 via the programmatic interface 24. The set of object classes 30 enable the browsing and modeling of a set of semantic elements 104A, 104B and 104C, hereinafter referred to as the semantic elements 104, that are implemented in the programming language 20.

The set of object classes 30 enable modeling and abstraction of the programming languages 20. The set of object classes 30 may include a ProjectItem object class 122, instances of which may return a FileCodeModel class object 128. The ProjectItem object class 122 is associated with a project 150. Instances of the FileCodeModel object class 128 are the root of instances of a CodeModel class object 126 for the project 150. Instances of a Project class object 124 may return an instance of the CodeModel class object 126 for the project 150. The CodeModel object class 126 enables the programmer to find code elements accessible within the project 150 via a fully qualified name. The CodeModel object class 126 further enables the programmer to determine in what programming language the project 150 is written. A CodeElement class object 130 may be created for each definition or declarative syntax in a language, and a CodeNameSpace class object 132 may be included to represent namespace declarations in the project 150.

Instances of a CodeType class object 134 may be included to track what type of object is associated with the set of object classes including, but not limited to, a CodeClass class object 136, a CodeInterface class object 138, a CodeEnum class object 140, a CodeDelegate class object 142, a CodeFunction class object 144, a CodeParameter class object 146, a CodeAttribute class object 148, a CodeStruct class object 150, a CodeVariable class object 152, a CodeProperty class object 154 and a CodeTypeRef class object 156.

Instances of the CodeClass class 136 may be utilized in browsing and modeling class definitions in the project 150 while instances of the CodeInterface class object 138 may be employed to browse and model interface definitions in the project 150. Instances of the CodeEnum class object 140 enable browsing and modeling enumeration definitions in the project 150. Similarly, instances of the CodeDelegate class object 142, the CodeFunction class object 144 and the CodeParameter class object 146 may be utilized in browsing and modeling enumerations, delegates and parameters respectively in the project 150. Instances of the CodeAttribute class object 148 may store a COM+ metadata attribute associated, for example, with the CodeElement class object 130.

Instances of the CodeStruct class object 150 may be utilized in browsing and modeling structure definitions in the project 150 while instances of the CodeVariable class object 152 may enable browsing and modeling variable definitions in the project 150. Similarly, instances of the CodeProperty class object 154 may be used to abstract how properties are defined in the programming languages 20. Furthermore, instances of the CodeTypeRef class object 156 may represent the type of a function, variable or parameter defined in the project 150. While several objects are described above, one skilled in the art will recognize that a different number of objects may be implemented in accordance with the present invention.

By way of further illustration, the code model 16 may include the CodeFunction class object 144 for modeling functions in programming languages. The CodeFunction class object 144 may have attributes including, but not limited to, attributes for storing the parent of the CodeFunction class object 144, for storing the kind of function modeled by the CodeFunction class object 144 (e.g. whether it gets, sets, or processes data), for storing the type of function modeled by the CodeFunction class object 144, for storing the number and type of parameters in the function modeled by the CodeFunction class object 144, and for storing whether the function may be overloaded and whether it is overloaded. These attributes facilitate interacting with the CodeFunction class object 144 by providing the programmer with data useful in browsing and understanding the function being modeled by the CodeFunction class object 144. The CodeFunction class object 144 may also have methods including, but not limited to, methods for adding attributes to the CodeFunction class object 144, for adding parameters to the function interface and for removing parameters from the function interface. Such methods facilitate customizing the functionality modeled in the CodeFunction class object 144.

The CodeFunction class object 144 may thus provide an object-oriented interface to functions implemented in other programming languages. The programmer interfacing with the code model 16 may gain access to a function in the project 150 through the CodeFunction class object 144, rather than by calling the function in the project 150 directly. If the programmer desires, the programmer may modify the interface to the function via the methods available to the CodeFunction class object 144. The programmer may also change the function encapsulated by the CodeFunction class object 144, by accessing its code as stored in a text buffer, for example.

Thus, for example, the code model programmer desiring sorting functionality may interact with the CodeFunction class object 144 that models the sorting functionality of an underlying language. Therefore, the programmer gains access to such sorting functionality without learning the syntax of the language behind the modeling object. Similar to the attributes and methods described for the CodeFunction class object 144, attributes and methods may be available for similar interactions with the plurality of object classes 30 in accordance with the present invention. While, for purposes of illustration, several attributes and methods are discussed above in association with the CodeFunction class object 144, it will be understood and appreciated by those skilled in the art that a greater or lesser number of attributes and methods may be implemented in accordance with the present invention.

Figure 2C:
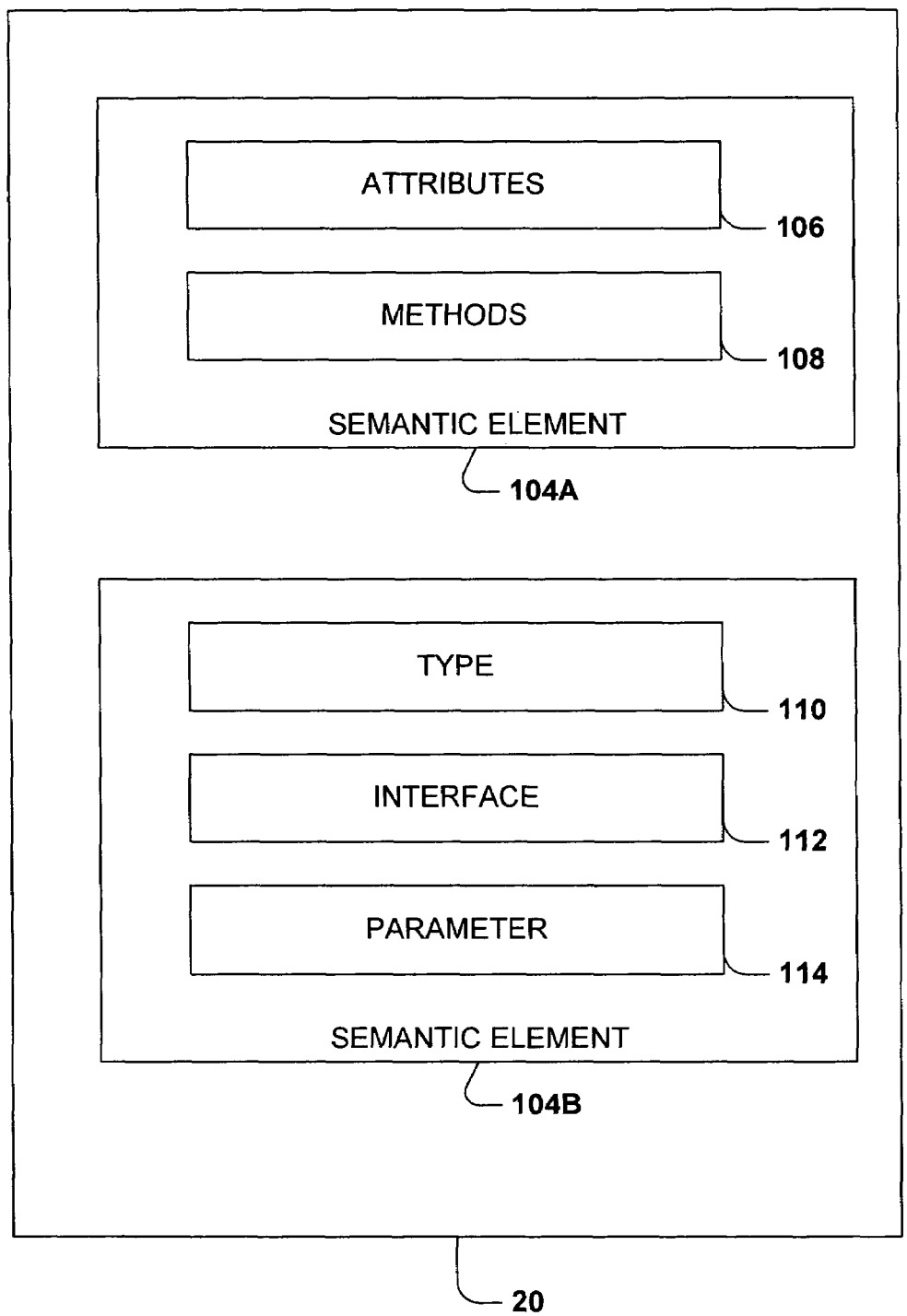
FIG. 2C is a schematic block diagram illustrating two example semantic elements in accordance with an aspect of the present invention.

FIG. 2C illustrates two semantic elements 104A and 104B, hereinafter known as the semantic elements 104, which depict a possible subset of available semantic elements from the programming languages 20. Semantic elements like 104A and 104B that are common and shared between the languages 20 may be modeled readily by the code model objects 30. The semantic element 104A may, for example, represent an object implemented in the programming language 20. The object represented by semantic element 104A may include one or more attributes 106 and one or more methods 108. As shown above in FIG. 2B, the CodeAttribute class 148 is available to help browse and model the attributes 106 of the object represented by the semantic element 104A. Similarly as shown above in FIG. 2B, the CodeClass class 136 is available to help browse and model the class membership and hierarchy of the object represented by semantic element 104A.

The semantic element 104B may, for example, represent a function. The function represented by semantic element 104B may include, for example, a type 110, an interface 112 and a parameter 114 that enable calling the function. For example, a square root function may be named square_root, may return a floating point type number and take as a parameter a floating point number. Described above in FIG. 2B, the CodeFunction class object 144 is available to help browse and model the function represented by semantic element 104B. Similarly, the CodeParameter object class 146 and the CodeTypeRef object class 156 are available to help browse and model the parameter 114 and the type 110 of the function represented by the semantic element 104B.

FIGS. 2A, 2B and 2C illustrate the code model 16 interactions with semantic elements available in programming languages 20 at an object oriented, semantic level by providing a plurality of objects for browsing and modeling the semantic elements available in the programming languages 20.

Figure 3:
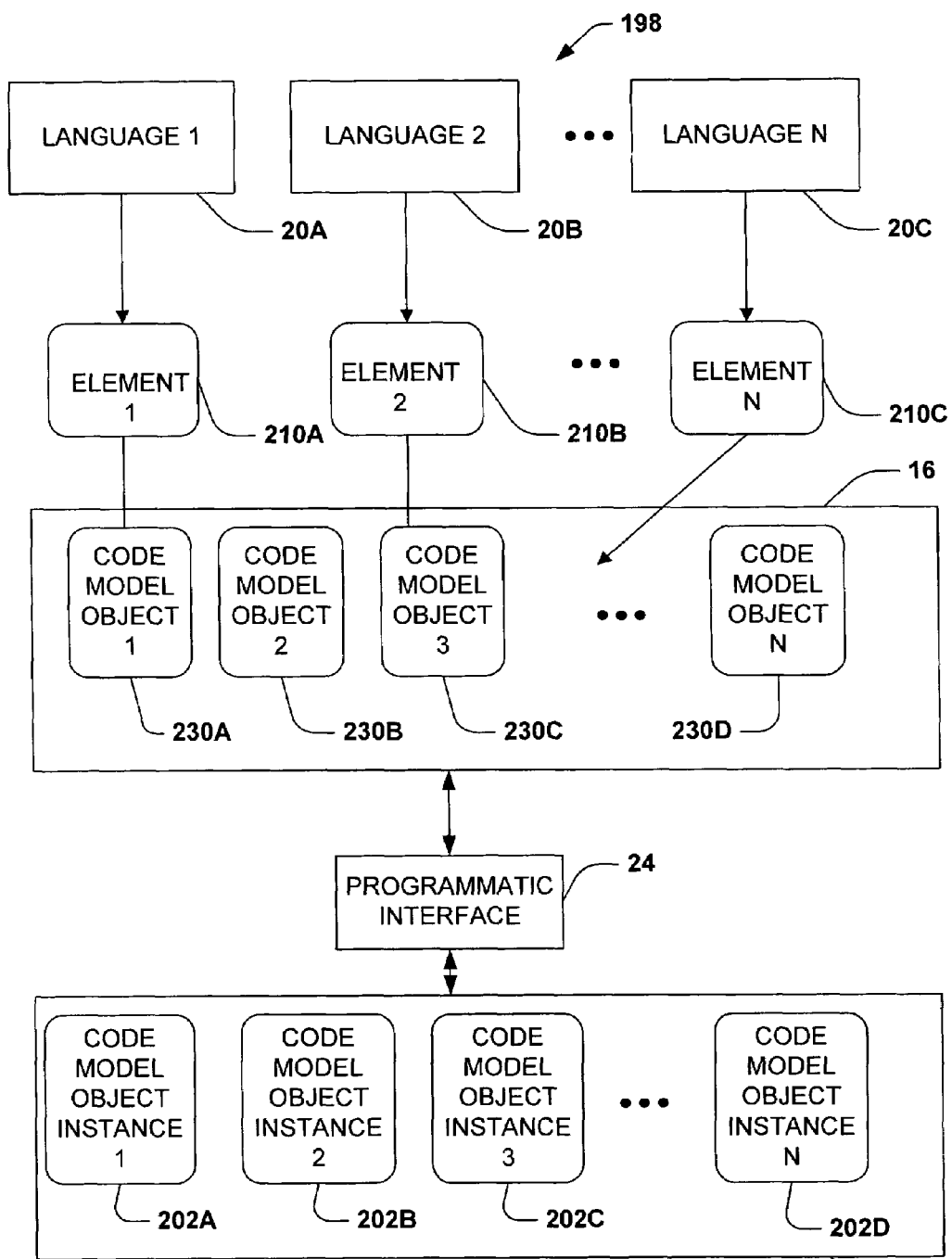
FIG. 3 is a schematic block diagram illustrating a system for interacting with computer programming languages, which system comprises a plurality of code model objects that implement objects from a plurality of programming languages in accordance with an aspect of the present invention.

FIG. 3 illustrates a system 198 for interacting with the programming languages 20. A computer programming project incorporates a plurality of instances of code model objects 202A, 202B, 202C and 202D, hereinafter referred to as the incorporated objects 202, each of which may store code and data associated with a semantic element 210A, 210B, or 210C, hereinafter referred to as the semantic elements 210, available from the programming languages 20. The programmer may access the semantic elements 210 through the programmatic interface 24 of the code model 16, which encapsulates the data and the functionality of the semantic elements 210 in a plurality of code model objects 230A, 230B, 230C and 230D, hereinafter referred to as the code model objects 230, copies of which may be incorporated into the computer programming project 200 as the incorporated objects 202.

For example, the incorporated objects 202 may include a CodeVariable object (not shown) that models a variable from the project 150. Such a CodeVariable object may have attributes that include, but are not limited to, an attribute for storing a parent of the CodeVariable object, for storing the initial expression and/or value for the variable modeled by the CodeVariable object, for storing the type of the variable modeled by the CodeVariable object, for storing whether the variable belongs to a class or to instances of a class and for whether the variable is a constant. Having the parent of the CodeVariable object available may help resolve inheritance issues. Similarly, having the initial expression and/or value for a variable available may help in initialization processing and in debugging. Knowing whether a variable is a constant facilitates programming decisions concerning that variable, for example, changing its type.

The CodeVariable object may also have methods including, but not limited to, methods for adding or removing attributes from the CodeVariable object. Thus, a programmer may have access to variables implemented in underlying programming languages without learning the syntax of those underlying programming languages.

The code model programmer may interact with the CodeVariable object rather than with the underlying programming languages 20 directly. In this manner, the programmer may remain insulated from syntactic and semantic details of variable access in various languages implementing desired functionality. For example, a programmer may desire to include in the project 12 a variable storing the time and date for a particular time zone and for storing the time and date for Greenwich Standard Time. Rather than make calls directly to a language that has such variables, the programmer may access such variables through the code model objects 230-234 that model the variables providing the desired functionality.

While, for purposes of illustration, several attributes and methods are discussed above in association with the CodeVariable object, it will be understood and appreciated by those skilled in the art that a greater or lesser number of attributes and methods may be implemented in accordance with the present invention.

Figure 4:
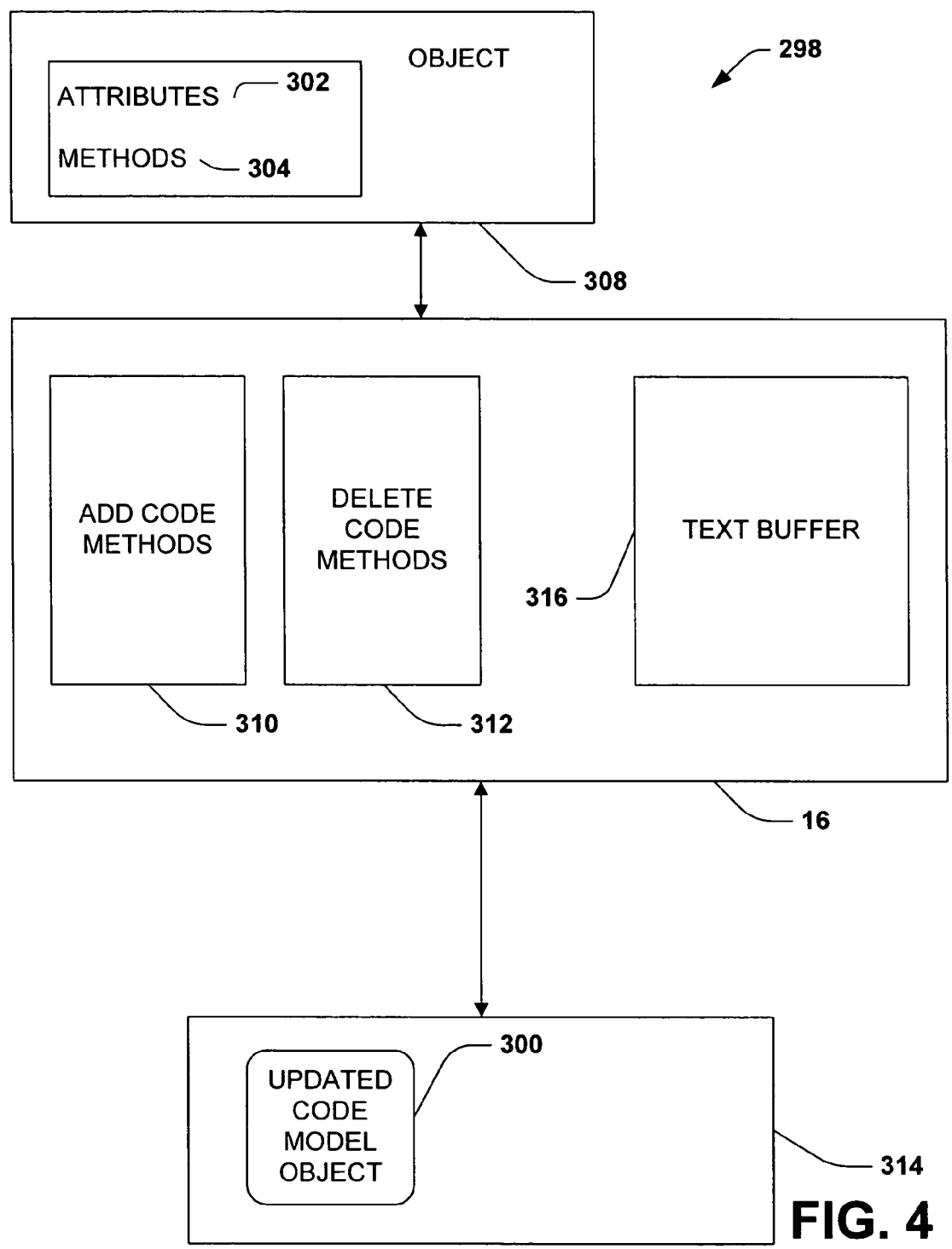
FIG. 4 is schematic block diagram illustrating a system for updating object functionality as modeled by code model objects using both code model object methods and manual editing of programming code in accordance with an aspect of the present invention.

FIG. 4 illustrates a system 298 for producing a code model object 300 that has been updated. For example, an attribute 302 or a method 304 of an object 308 may be different in the instance of the code model object 300 than in the original object 308. Code may be added to the object 300 by using an add code method 310 provided by the code model 16. This may be achieved, for example, by first coding a segment of code, then passing a pointer to that segment of code to the add code method 310 which would then inject the segment of code into the updated code model object 300. The programmer may delete code from the object 300 by utilizing a delete code method 312 provided by the code model 16. This may be achieved, for example, by first identifying a segment of code the programmer desires to delete. Then, the programmer may pass a pointer associated with the start and end of the segment to the delete code method 312 which would then delete the code. The object 300, after being updated may then be incorporated into a computer programming project 314 as an updated code model object 300.

By way of illustration, the starting point in a text buffer 316 where an exemplary CodeElement object (not shown) may reside, and the ending point in the text buffer 316 where the CodeElement object may reside may be used by a programmer who desires to modify the code behind the CodeElement. Rather than using the programmatic interface 24 (FIG. 1) to the CodeElement object, the programmer may access the text buffer directly to code any desired changes manually. For example, the code model object 300 may include graphing functionality for displaying a line of English text in Italian. A project may not require such Italian display but may require a French display. A method to add a function may be available in the code model object 300 and may add the desired French display function. Similarly, a method to add an attribute may be available in the code model object 300 and may add a location to store the desired French string. The programmer may also manually access the code of the object 300 through the text buffer 316 and change the object 300 by coding the desired changes. Furthermore, the programmer may manually remove the method or methods implementing the Italian display, and the programmer may also manually remove the variables employed in storing the Italian display.

Figure 5:
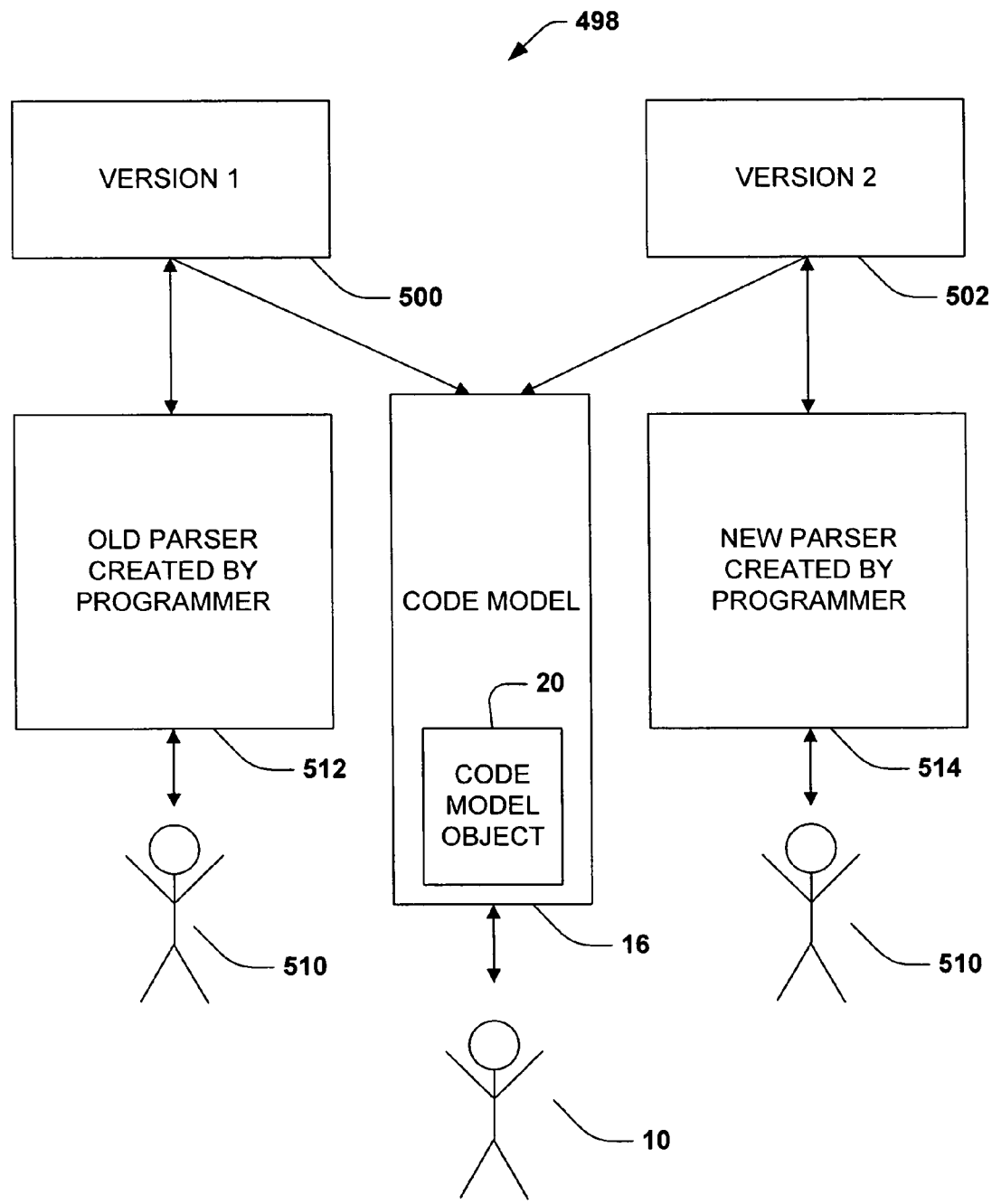
FIG. 5 is a schematic block diagram illustrating a system for interacting with a computer language, both before and after it has been updated, through the code model objects in accordance with an aspect of the present invention.

FIG. 5 illustrates a system 498 for transparent interactions with different versions of a computer language. The language will be referred to as version 1, 500 before it has been updated, and will be referred to as version 2, 502 after it has been updated. A first programmer 10 can interact with the code model 16 instead of interacting directly with version 1, 500 or version 2, 502. A second programmer 510 who is not interacting with the code model 16 may create a parser 512 to interact with version 1, 500 and may create a second parser 514 to interact with version 2, 502. The benefit to the first programmer 10 interacting with the code model 16 is that the change from version 1 500 and version 2 502 is transparent because the programmer may interact indirectly with the functionality of the languages 500 and 502 via the code model object 520, rather than with the syntax of the languages 500 and 502.

Figure 6:
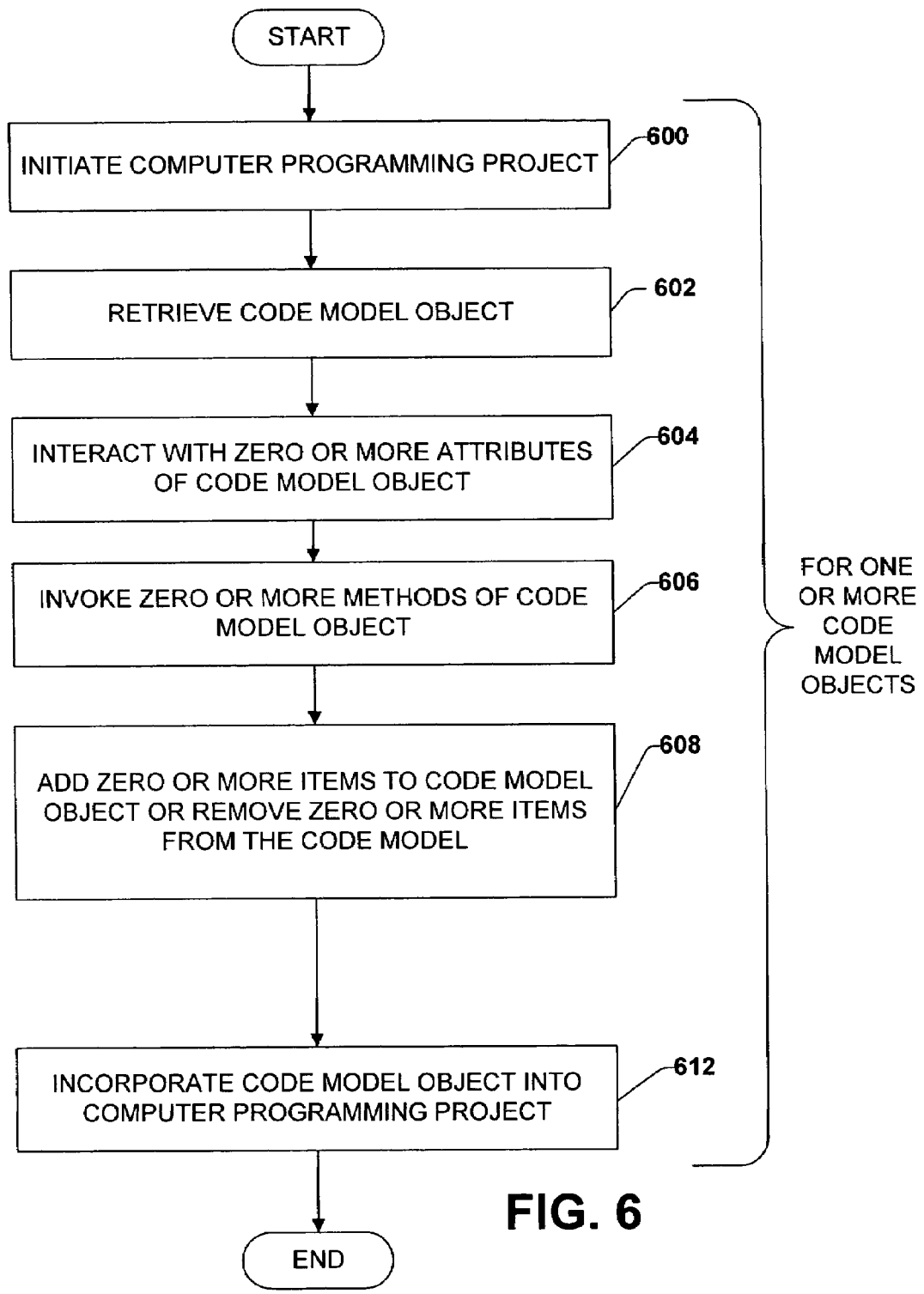
FIG. 6 is a flow diagram illustrating a methodology for interacting with computer programming languages by using a programmatic interface to the code model invention in accordance with an aspect of the present invention.

FIG. 6 illustrates a methodology for interacting with computer programming languages via a programmatic interface to the code model. For one or more code model objects, steps 600 through 612 may be performed. Steps 602 through 612 need not be performed in the sequence illustrated, and may be performed in substantially any sequence and repeated. At step 600 a project may be initiated, for example, to create a database application. At step 602, a code model object may be retrieved from the code model so that, for example, a certain semantic concept can be employed by the programmer. At step 604, zero or more attributes of the code model object retrieved at step 602 may be interacted with (e.g. read, written, changed) to determine whether the attributes need to be updated, for example. At step 606, zero or more methods of the code model object retrieved at step 602 may be invoked so that, for example, certain functionality can be accomplished. At step 608, zero or more items may be added to or removed from the code model object retrieved at step 602. Items may be added, so that, for example, the functionality of that object retrieved at step 602 may be extended to include, for example, a French version of an English string, as described above. Items may be removed so that, for example, the efficiency of the object retrieved at step 602 may be increased by reducing its overall memory requirements. At step 612, the code model object retrieved at step 602 may be incorporated into the programming project initiated in step 600 so that the modeled functionality may be employed in the programming project.

By way of illustration, a programmer may be involved with a project that requires a number to be squared and raised to its fourth power. The programmer may retrieve an object in step 602 that implements part of the desired functionality. For example, the object retrieved in step 602 may implement the square and the cube of a number. After examining the functionality modeled by the code model object retrieved in step 602, which encapsulates the current functionality, the programmer may read the square attribute from the object retrieved in step 602, may delete the cube attribute from the object retrieved in step 602 and may add an attribute to store the number raised to its fourth power. The programmer may then delete the cube method and add the raising to the fourth power method. After making such additions and deletions, the programmer may then incorporate the updated code model object retrieved in step 602 into the project. The above described process may occur with the programming language implementing the desired mathematical functionality thereby remaining transparent to the programmer.

Figure 7:
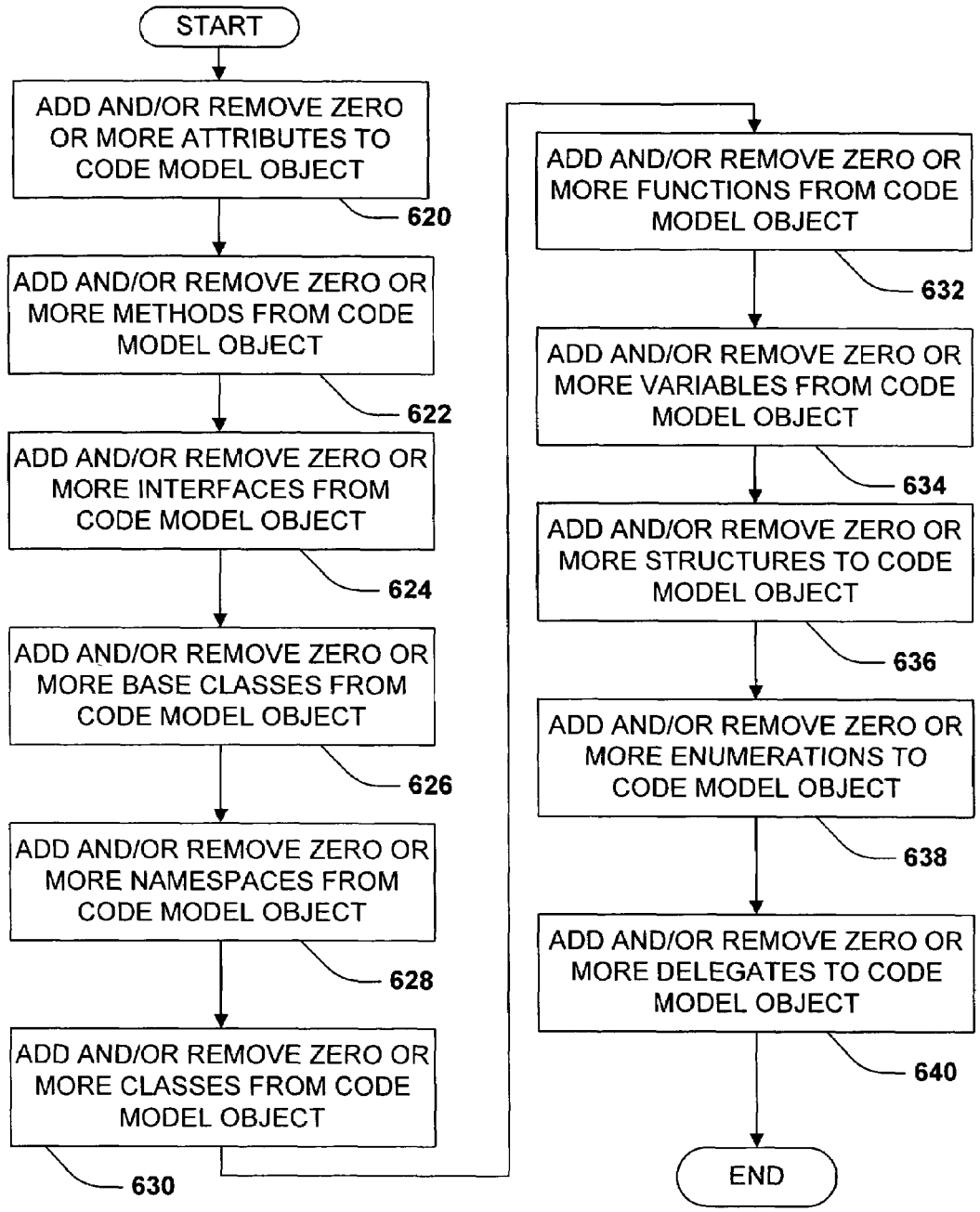
FIG. 7 is a flow diagram illustrating a methodology for interacting with a code model object in accordance with an aspect of the present invention.

Turning now to FIG. 7, step 608 from FIG. 6 may be broken down into sub steps. A flow diagram illustrates a methodology for interacting with a code model object. Steps 620 through 638 need not be performed in the sequence illustrated and can be performed in substantially any sequence and may be repeated. While a plurality of various interactions are illustrated in FIG. 7, it is to be appreciated by one skilled in the art that a greater or lesser number of such interactions may implemented in accordance with the present invention.

At step 620, zero or more attributes are added and/or removed from the code model object retrieved at step 602 (FIG. 6). The ability to add and remove attributes from code model objects enables objects to be tailored to meet specific needs. Additional attributes may extend the memory of objects, for example. Removing attributes can also increase efficiency and reduce the size of objects. For example, in the above illustration, removing the attribute for storing the cube of a number may reduce the overall size of the object thereby decreasing memory requirements and increasing efficiency.

At step 622, zero or more methods are added and/or removed from the code model object retrieved at step 602. Similar to the advantage of being able to add and remove attributes from an object, the ability to add and remove methods from a code model object enables an object to be tailored to meet specific needs. Additional methods can extend the functionality of an object. Removing methods may increase efficiency and reduce the size of an object. For example, in the above illustration, removing the method for performing the arithmetic to compute the cube of a number may reduce the overall size of the object thereby decreasing memory requirements and increasing efficiency.

At step 624, zero or more interfaces may be added and/or removed from the code model object retrieved at step 602. The interfaces may be added if additional functionality is required, and they may be removed if desired. At step 626, zero or more base classes can be added and/or removed from the code model object retrieved at step 602. Removing base classes may solve inheritance problems and increase efficiency, for example. Adding base classes may produce a benefit by allowing for multiple inheritance, for example. At step 628, zero or more namespaces can be added and/or removed from the code model object retrieved at step 602. At step 630, zero or more classes can be added and/or removed from the code model object retrieved at step 602.

At step 632, zero or more functions can be added and/or removed from the code model object retrieved at step 602 while at step 634, zero or more variables can be added and/or removed from the code model object retrieved at step 602. Similarly, at steps 636, 638 and 640, zero or more structures, enumerations and delegates can be added and/or removed from the code model object retrieved at step 602. Adding and removing any of the above mentioned items facilitates customizing the code model object retrieved at step 602. Such customization may, for example, increase the efficiency of the object retrieved at step 602 and may also, for example, simplify utilizing the object.

Figure 8:
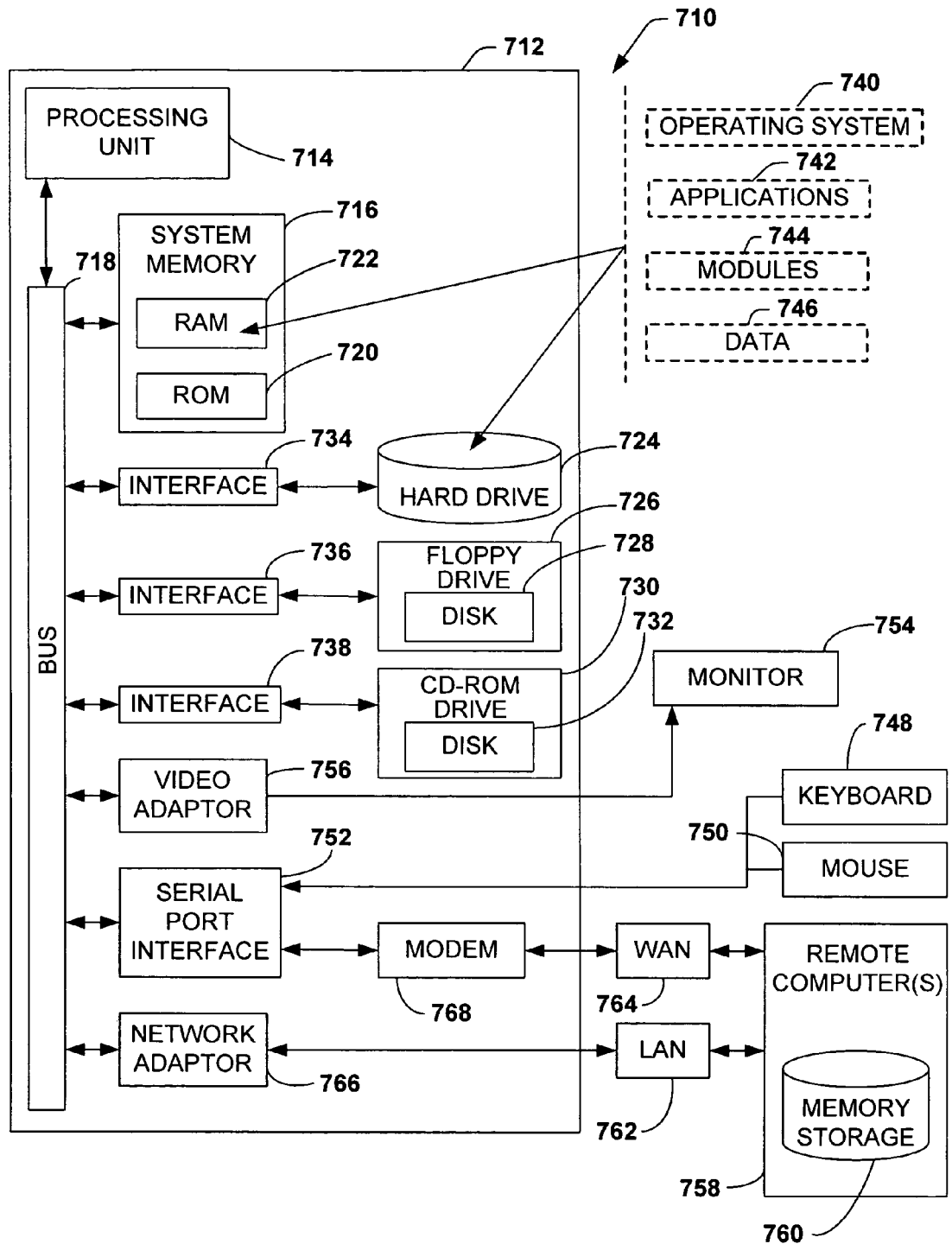
FIG. 8 is a schematic block diagram of an exemplary operating environment for a system configured in accordance with the present invention.

With reference to FIG. 8, an exemplary environment 710 for implementing various aspects of the invention includes a computer 712, including a processing unit 714, a system memory 716, and a system bus 718 that couples various system components including the system memory to the processing unit 714. The processing unit 714 may be any of various commercially available processors, including but not limited to Intel x86, Pentium® and compatible microprocessors from Intel and others, including Cyrix, AMD and Nexgen; Alpha® from Digital; MIPS® from MIPS Technology, NEC, IDT, Siemens, and others; and the PowerPC® from IBM and Motorola. Dual microprocessors and other multiprocessor architectures also can be used as the processing unit 714.

The system bus 718 may be any of several types of bus structure including a memory bus or memory controller, a peripheral bus, and a local bus using any of a variety of conventional bus architectures such as PCI, VESA, Microchannel, ISA, and EISA, to name a few. The computer 712 memory includes read only memory (ROM) 720 and random access memory (RAM) 722. A basic input/output system (BIOS), containing the basic routines that help to transfer information between elements within the computer 712, such as during start-up, is stored in ROM 720.

The computer 712 further includes a hard disk drive 724, a magnetic disk drive 726, e.g., to read from or write to a removable disk 728, and an optical disk drive 730, e.g., for reading a CD-ROM disk 732 or to read from or write to other optical media. The hard disk drive 724, magnetic disk drive 726, and optical disk drive 730 are connected to the system bus 718 by a hard disk drive interface 734, a magnetic disk drive interface 736, and an optical drive interface 738, respectively. The drives and their associated computer-readable media provide nonvolatile storage of data, data structures, computer-executable instructions, etc. for the computer 712, including for the storage of broadcast programming in a suitable digital format. Although the description of computer-readable media above refers to a hard disk, a removable magnetic disk and a CD, it should be appreciated by those skilled in the art that other types of media which are readable by a computer, such as zip drives, magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 722, including an operating system 740, one or more application programs 742, other program modules 744, and program data 746. The operating system 740 in the illustrated computer is, for example, the "Microsoft Windows NT®" operating system, although it is to be appreciated that the present invention may be implemented with other operating systems or combinations of operating systems, such as UNLX®, LINUX®, etc.

A user may enter commands and information into the computer 712 through a keyboard 748 and a pointing device, such as a mouse 750. Other input devices (not shown) may include a microphone, an IR remote control, a joystick, a game pad, a satellite dish, a scanner, or the like. These and other input devices are often connected to the processing unit 714 through a serial port interface 752 that is coupled to the system bus 718, but may be connected by other interfaces, such as a parallel port, a game port, a universal serial bus ("USB"), an IR interface, etc. A monitor 754 or other type of display device is also connected to the system bus 718 via an interface, such as a video adapter 756. In addition to the monitor, a computer typically includes other peripheral output devices (not shown), such as speakers, printers etc.

The computer 712 may operate in a networked environment using logical connections to one or more remote computers, such as a remote computer(s) 758. The remote computer(s) 758 may be a workstation, a server computer, a router, a personal computer, microprocessor based entertainment appliance (e.g., a WebTV client system), a peer device or other common network node, and typically includes many or all of the elements described relative to the computer 712, although, for purposes of brevity, only a memory storage device 760 is illustrated. The logical connections depicted include a local area network (LAN) 762 and a wide area network (WAN) 764. Such networking environments are commonplace in offices, enterprise-wide computer networks, intranets and the Internet.

When used in a LAN networking environment, the computer 712 is connected to the local network 762 through a network interface or adapter 766. When used in a WAN networking environment, the computer 712 typically includes a modem 768, or is connected to a communications server on the LAN, or has other means for establishing communications over the WAN 764, such as the Internet. The modem 768, which may be internal or external, is connected to the system bus 718 via the serial port interface 752. In a networked environment, program modules depicted relative to the computer 712, or portions thereof, may be stored in the remote memory storage device 760. It will be appreciated that the network connections shown are exemplary and other means of establishing a communications link between the computers may be used.

In accordance with the practices of persons skilled in the art of computer programming, the present invention has been described with reference to acts and symbolic representations of operations that are performed by a computer, such as the computer 712 or remote computer(s) 758, unless otherwise indicated. Such acts and operations are sometimes referred to as being computer-executed. It will be appreciated that the acts and symbolically represented operations include the manipulation by the processing unit 714 of electrical signals representing data bits which causes a resulting transformation or reduction of the electrical signal representation, and the maintenance of data bits at memory locations in the memory system (including the system memory 716, hard drive 724, floppy disks 728, CD-ROM 732) to thereby reconfigure or otherwise alter the computer system's operation, as well as other processing of signals. The memory locations where such data bits are maintained are physical locations that have particular electrical, magnetic, or optical properties corresponding to the data bits.

What has been described above includes examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising."

What is claimed is:

1. A system for interacting with computer programming languages comprising:
    a memory component configured to store computer-readable instructions, the computer-readable instructions including instructions for performing the following acts:
        storing a plurality of objects associated with a single code model that encapsulate semantic elements for each of a plurality of programming languages and provide a language neutral interface thereto that insulates a user from using syntaxes associated with any of the plurality of programming languages;
        providing the user with semantic-level access to at least a first object and a second object, the first object encapsulating semantic elements for a first programming language, the second object encapsulating semantic elements for a second programming language, the first programming language different than the second programming language; and
        providing the user with semantic-level access to at least a third code model object and a fourth code model object, wherein the third code model object is an instance of a CodeClass class, and the fourth code model object is an instance of a CodeInterface class, wherein the CodeClass class is called when the user browses and models class definitions, and wherein the CodeInterface class is called when the user browses and models interface definitions.

2. The system of claim 1, wherein the single code model models at least one of a syntax, one or more functions, one or more disparate objects, or one or more disparate data structures associated with the plurality of programming languages.

3. The system of claim 1, wherein the plurality of objects are defined by a set of object classes that facilitate modeling and abstraction of the computer programming languages.

4. The system of claim 3, wherein the semantic elements include at least one of an attribute, a method, a type, an interface, a statement, an expression or a parameter.

5. The system of claim 3, wherein the set of object classes further comprise at least one of a project item, a project, a disparate code model, a file code model, a code element, a code name space, a code type, a disparate code class, a code interface, a code enumeration, a code delegate, a code function, a code parameter, a code attribute, a code structure, a code variable, a code property, or a code type reference.

6. The system of claim 5 further comprising a programmatic interface, wherein the programmatic interface includes a method that facilitates interacting with the set of object classes.

7. The system of claim 5, wherein the plurality of objects associated with the computer programming languages are modified via at least one of an add code method, a delete code method, or coding via a text buffer.

8. The system of claim 5, further comprising a CodeVariable object that facilitates modeling variables within a project.

9. The system of claim 8, wherein the code variable object further comprises attributes that include at least one of an attribute that facilitates storing a parent of the CodeVariable object, an attribute that facilitates storing the initial expression and value for a variable modeled by the CodeVariable object, an attribute that facilitates storing a type of the variable modeled by the CodeVariable object, an attribute that facilitates determining whether the variable belongs to a class or to instances of a class, or an attribute that facilitates determining whether the variable is a constant.

10. A programmatic interface that employs the system of claim 1, the programmatic interface encoded as software on a computer-readable medium.

11. A computing system that employs a processor to execute computer executable instructions stored on a computer readable storage medium to implement the system of claim 1.

12. A system for interacting with computer programming languages at a semantic and syntactic level comprising:
a memory component configured to store computer-readable instructions, the computer-readable instructions including instructions for performing the following acts:
launching a single code model associated with a plurality of code model objects that facilitates a programmatic interface to interact with each of a plurality of computer programming languages at a semantic and syntactic level in a language neutral manner, the code model provides isolation between the programmatic interface and a particular syntax corresponding to any of the computer programming languages;
facilitating semantic-level access to at least a first code model object, a second code model object, a third code model object, and a fourth code model object to a user, the first code model object modeling a first semantic element corresponding to a first computer programming language, the second code model object modeling a semantic element corresponding to a second computer programming language, the first semantic element different than the second semantic element;
upon request from a user to browse and model class definitions, accessing the third code model object, which third code model object is an instance of a CodeClass class;
upon request from a user to browse and model interface definitions, accessing the fourth code model object, which fourth code model object is an instance of a CodeInterface class; and
inserting the first code model object and the second code model object into a single program project.

13. The system of claim 12, wherein the plurality of code model objects encapsulate functionality of the computer programming languages.

14. The system of claim 12, wherein at least one of the first or second semantic elements include at least one of an attribute, a method, a type, an interface, or a parameter.

15. The system of claim 13, wherein the code model describes at least one of a syntax, one or more functions, one or more objects, or one or more data structures associated with the computer programming languages.

16. The system of claim 13, wherein the code model objects are defined by a set of object classes that facilitate modeling and abstraction of the computer programming languages.

17. The system of claim 16, wherein the set of object classes further comprise at least one of a project item, a project, a disparate code model, a file code model, a code element, a code name space, a code type, a disparate code class, a code interface, a code enumeration, a code delegate, a code function, a code parameter, a code attribute, a code statement, a code expression, a code structure, a code variable, a code property, or a code type reference.

18. The system of claim 16, wherein the set of object classes associated with the computer programming languages are modified to generate the code model objects via at least one of an add code method, a delete code method, or coding via a text buffer.

19. The system of claim 16, further comprising a CodeVariable object that models variables within a project.

20. The system of claim 19, wherein the code variable object further comprises attributes that include at least one of an attribute that facilitates storing a parent of the CodeVariable object, an attribute that facilitates storing the initial expression and a value for a variable modeled by the CodeVariable object, an attribute that facilitates storing a type of the variable modeled by the CodeVariable object, an attribute that facilitates determining whether the variable belongs to a class or to instances of a class, or an attribute that facilitates determining whether the variable is a constant.

21. A system of one or more processors for neutralizing a programming language and further comprising:
storing a plurality of objects, each of the plurality of objects defined by an object class that enables modeling each of a plurality of programming language, each of the plurality of objects encapsulates a semantic element of at least one programming language and provides a language neutral interface to the at least one programming language; and
a programmatic interface, wherein the programmatic interface includes methods that facilitate interacting with the object class, the programming interface insulates a user from a syntax associated with the programming language, the programmatic interface provides semantic-level access to at least a first object, a second object, a third object, and a fourth object to a user, the first object encapsulating semantic elements for a first programming language, the second object encapsulating semantic elements for a second programming language, the first programming language different than the second programming language, and the programmatic interface facilitates incorporating the first object and the second object into a single program project, and wherein the third object is an instance of a CodeClass class that is called when the user browses and models class definitions while the third object is an instance of a CodeInterface class that is called when the user browses and models interface definitions.

22. The system of claim 21, at least one of the plurality of objects is associated with a code model that facilitates modeling a syntax associated with at least one of the programming languages.

23. The system of claim 21, further comprising a code model that facilitates modeling a syntax associated with at least one of the programming languages.

24. The system of claim 23, at least a portion of the semantic elements for the first programming language or the semantic elements for the second programming language includes each of an attribute, a method, a type, an interface, a statement, an expression and a parameter.

25. The system of claim 24, wherein the object class further comprises each of a project item, a project, a disparate code model, a file code model, a code element, a code name space, a code type, a code class, a code interface, a code enumeration, a code delegate, a code function, a code parameter, a code attribute, a code structure, a code variable, a code property, and a code type reference.

26. The system of claim 25, at least one of the objects, is modified via each of an add code method, a delete code method, and coding via a text buffer.

27. The system of claim 26, further comprising a CodeVariable object that models variables within a project.

28. The system of claim 27, the code variable object further comprises attributes that include each of an attribute that facilitates storing a parent of the CodeVariable object, an attribute that facilitates storing the initial expression and value for the variable modeled by the CodeVariable object, an attribute that facilitates storing a type of a variable modeled by the CodeVariable object, an attribute that facilitates determining whether the variable belongs to a class or to instances of a class, and an attribute that facilitates determining whether the variable is a constant.

* * * * *